United States Patent [19]

Yamamura et al.

[11] Patent Number: 4,540,942

[45] Date of Patent: Sep. 10, 1985

[54] ALTERNATING CURRENT INDUCTION METHOD USING AN ANNULAR MAGNETIC COUPLING BODY FOR DETECTING THE POSITION OF A BURIED SUBMARINE CABLE

[75] Inventors: Kazuomi Yamamura, Yokohama; Hideo Ishihara, Kamakura; Yoshinao Iwamoto, Fujimi; Shizuo Suzuki, Yokohama; Yuichi Sirasaki, Tokyo; Kenichi Asakawa, Hachiohji, all of Japan

[73] Assignee: Kokusai Denshin Denwa Co., Ltd., Tokyo, Japan

[21] Appl. No.: 282,876

[22] Filed: Jul. 13, 1981

[30] Foreign Application Priority Data

Jul. 16, 1980 [JP] Japan ................................. 55-96252
Jul. 16, 1980 [JP] Japan ................................. 55-96253

[51] Int. Cl.³ .................. G01V 3/11; G01V 3/15; F16L 1/04; H02G 1/10
[52] U.S. Cl. ..................... 324/326; 324/127; 405/160
[58] Field of Search ............ 324/51, 67, 326, 127, 324/52; 455/40; 405/157, 159, 160, 164, 174, 175

[56] References Cited

U.S. PATENT DOCUMENTS

| | | | |
|---|---|---|---|
| 2,989,621 | 6/1961 | Barton et al. | 455/40 |
| 3,052,837 | 9/1962 | Arbogast et al. | 324/329 |
| 3,314,009 | 4/1967 | Murdock | 324/127 X |
| 3,338,059 | 8/1967 | Tittle | 324/326 X |
| 3,418,572 | 12/1968 | Humphreys | 324/67 |
| 3,526,831 | 9/1970 | Smith | 324/52 X |
| 3,617,865 | 11/1971 | Hakata | 324/67 X |
| 3,771,049 | 11/1973 | Piccione | 324/127 X |
| 4,075,675 | 2/1978 | Burkett et al. | 324/51 X |
| 4,142,143 | 2/1979 | Daniel | 324/51 |
| 4,283,681 | 8/1981 | Kazuomi et al. | 324/326 |
| 4,325,022 | 4/1982 | Pelletier | 324/127 X |

Primary Examiner—Gerard R. Strecker

[57] ABSTRACT

A device for burying a submarine cable under the water by easily and accurately detecting the cable position and a method for guiding the same by utilizing the characteristics unique to submarine cables, by supplying an AC only to the portion of the cable between two arbitrary repeaters through a so-called transformer-coupling system to generate an AC magnetic field, and by detecting the magnetic field with a magnetic field detector.

1 Claim, 20 Drawing Figures

4,540,942

ALTERNATING CURRENT INDUCTION METHOD USING AN ANNULAR MAGNETIC COUPLING BODY FOR DETECTING THE POSITION OF A BURIED SUBMARINE CABLE

BACKGROUND OF THE INVENTION

The present invention concerns a device for burying submarine cables or re-burying cables which are laid out on the sea and river beds, and a method for guiding the same.

The cables for communication, electric power etc. in recent years are more and more installed for longer distances and increasing number of the cables have been laid out upon sea or river beds. Since this type of cable is required to offer a higher reliability, various methods have been devised for installation thereof; for instance, there has been widely used an installation method to bury the cable under the sea or river beds in a fairly shallow water area in order to protect the cable from damage which might be caused by fishing gear or ship anchors. For maintaining high reliability of the cable system it is of utmost importance to have sufficient technology required to monitor the cable installation works, to repair it promptly at the time of failure and/or to give proper protection after such repair (such as re-burying works for the cables which have been excavated out of the bed for repair). Such technology has currently been the object of research and development in various countries.

In order to achieve proper works for monitoring, repair, protection, re-burying, etc. for the cables, it is required to have the technology to detect the position of the cable which has been buried under the sea bed, and to have cable tracking technology to move working machines accurately along the buried cable. This requires an extremely sophisticated technology of detecting the cable position especially when the cable to be detected has been buried or installed underneath the sea bed in the open sea of a deeper water depth.

The monitoring method with an underwater TV camera mounted on a working machine has generally been used in prior art for detection or tracking of the submarine cables. However, that method is not necessarily satisfactory since it cannot be applied to buried cables and further since its detection performance is greatly limited in the water of high turbidity. Another method for detection and tracking has been proposed to be effective under any conditions by supplying a signal current to the cable and by detecting the magnetic field which is generated by the signal current. The method using direct current (DC) as the signal current, however, is not quite effective because of the difficulty to distinguish between the DC magnetic field generated from the cable and the geomagnetic field. Therefore, the development of a method using AC has become urgently needed.

The submarine cable communication system using coaxial cables has drawbacks in that the desirable frequency which will not affect the frequency band to be used for communication is limited to a few hundred Hz and that if such low frequency alternating current (AC) current is supplied from a terminal, the AC current becomes attenuated by the internal power separating filters everytime it passes through a repeater/amplifier (referred to as repeater hereinafter) inserted on the path to become almost zero after passing a few repeaters. Therefore, a method to supply an AC signal current to the cable from a place other than the terminal is strongly demanded.

The present invention aims to obviate such defects of the conventional method, and at the same time, to offer a device for burying the submarine cable under the water bed by easily and accurately detecting the cable position and a method for guiding the same by utilizing the characteristics unique to submarine cables, by supplying an AC only to the portion of the cable between two arbitrary repeaters through a so-called transformer-coupling system to generate an AC magnetic field, and by detecting the magnetic field with a magnetic field detector.

The method and the device according to the present invention will now be described in more detail referring to the embodiments indicated in attached drawings.

DETAILED DESCRIPTION OF PREFERRED EMBODIMENT

Figure 1A:
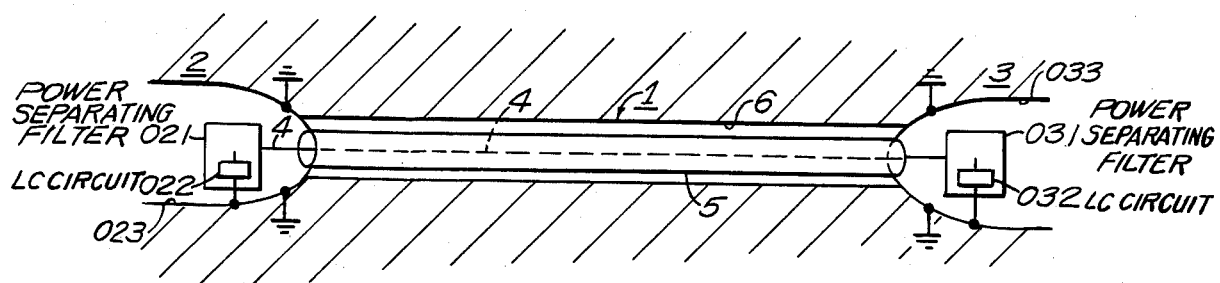
FIGS. 1(a), 1(b) and 1(c) schematically explain an embodiment of the method according to the present invention for generating AC magnetic fields.

FIG. 1(a) is a schematic view of an embodiment according to the present invention to explain a method for generating an AC magnetic field. The submarine cable system using a coaxial cable comprises a cable 1 and repeaters 2, 3 positioned at both sides of the cable. The cable 1 comprises an inner electric conductor 4, an outer electric conductor 5, and an insulation cladding 6. The inner electric conductor 4 goes into power separating filters 021, 031 and is electrically connected to repeater casings 023, 033 by LC circuits 022, 032 the impedance of which becomes comparatively small at low frequency and is earthed through the repeater casings 023, 033 to the sea water. The outer conductor 5, on the other hand, is insulated from the sea water in the cable portion by the insulation cladding 6, but is connected to the repeater casings 023, 033 in the portions of the repeaters 2, 3 so as to be earthed directly to the sea water therethrough. Accordingly, the following two closed circuits which allow low frequency AC current to pass therethrough are formed in this system. More particularly, there are formed:

Closed circuit 1:
   outer conductor 5→repeater casing 023→sea water→repeater casing 033→outer conductor 5

Closed circuit 2:
   inner conductor 4→power separation filter 021→repeater casing 023→sea water→repeater casing 033→power separation filter 031→inner conductor 4.

Therefore, if an exciter coil having an exciter wiring is coupled in such a way as to form an annular closed magnetic circuit at an arbitrary position of the cable which encircles the cable axis, and if AC signals for excitation are supplied to the exciter wiring, then AC signal current passes to the cable. The present invention utilizes such a principle, and by supplying AC signal current to the cable from an arbitrary position other than the terminal stations, an AC magnetic field is generated, which is then detected by the magnetic field detector of the burying device so as to guide the burying device along the cable.

Figure 1B:
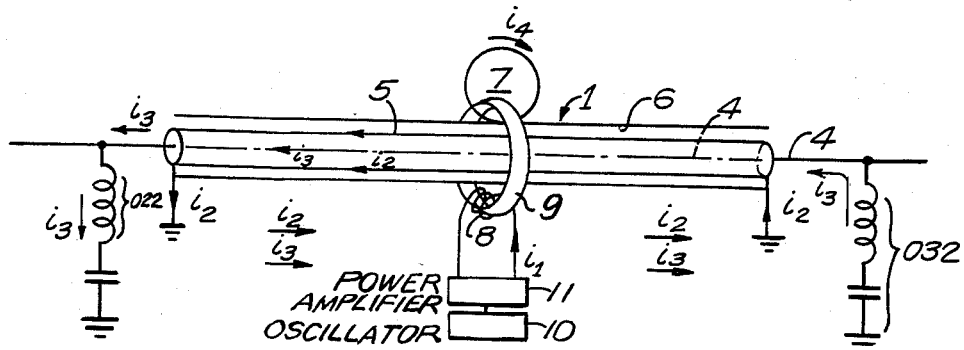
Figure 1C:
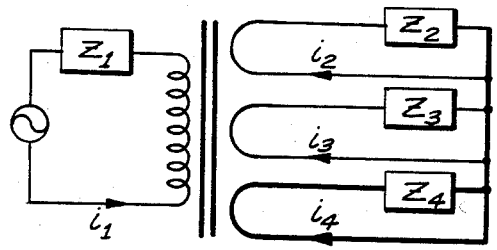

FIG. 1(b) shows the state wherein a magnetic core 9 having an exciting winding 8 is coupled to an arbitrary portion of a cable so as to form an annular closed circuit 7 encircling around the cable 1 in order to supply an AC signal current to said two closed circuits. The above state could be regarded as the state wherein the annular closed circuit 7 forms a 4-winding transformer having four windings, i.e. that of exciting winding 8, one turn of windings respectively formed by said two closed circuits and one turn of winding formed by the sea water alone. When an AC current $i_1$ is supplied to the exciting winding 8 of the annular closed circuit 7 via the oscillator 10 and the power amplifier 11, therefore, currents of $i_2$, $i_3$ and $i_4$ can be supplied to other three windings depending on the turn ratio against the exciting winding 8 and the impedance of the respective circuits. FIG. 1(c) indicates the state shown in FIG. 1(b) in a form of an equivalent circuit for better understanding, whereby the portion shown by a thick line denotes "the current line" where current passes through the sea water. While the current $i_4$ can not be utilized because it does not pass through the cable, the currents $i_2$ and $i_3$ can be utilized as the signal current because they pass through the cable. The above $i_2$, $i_3$ currents can be used for such purposes as to guide the travel of a working machine accurately along a cable by tracking the position of the cable by detecting the signal current by, for instance, a magnetic field detector carried on the machine. The impedance $Z_3$ in the closed circuit 1 shown in the above figure is infinitive in respect of DC and becomes fairly large value in respect of low frequency, whereby it becomes larger than the impedance $Z_2$ in the closed circuit 1. Therefore, it could be said that the current $i_2$ plays a main role in the present invention.

Figure 2:
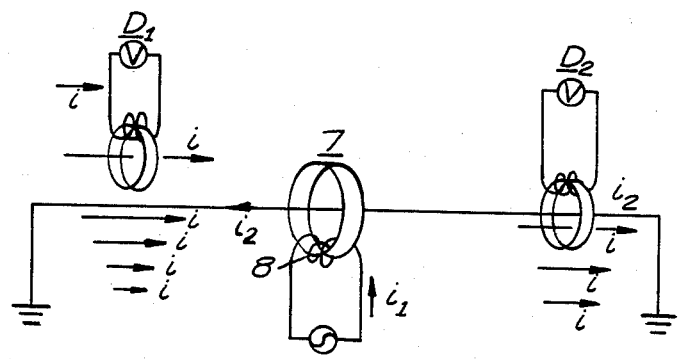
FIG. 2 is a schematic view of the state wherein AC signal current passing through the cable is being detected.

FIG. 2 schematically indicates the concept in which the AC signal current $i_2$ passing through the cable can be detected. In the system according to the present invention, since the return circuit of the signal current $i_2$ passing through the cable is formed by the sea water which is extensive in three dimensions, there arises a doubt whether the signal current $i_2$ can be effectively detected by an AC magnetic field detector which is set up within the sea water. However, as shown in FIG. 2, the current on the return circuit does not generally concentrate on the water immediately near the cable but passes divergently as well as extensively to reach the mass of water considerably apart from the cable in respect of a low frequency or a frequency smaller than several KH$_z$ except for the case of fairly high frequency. Therefore, in the case of the detector $D_1$, the magnetic field out of the current $i_2$ passing through the cable can be effectively detected because the annular closed circuit is adapted to be positioned very close to the cable so that the current which passes through the inner side of the annular closed circuit as the current effective for the detection by the means of the sea water can be offset by the current which passes through the outer side to the direction to cancel the detection signals. In the case of the detector $D_2$, on the other hand, the current $i_2$ passing through the cable can be effectively detected by such measures as to prevent the sea water from passing through the inside of the annular closed circuit by minimizing the diameter of the annular closed circuit.

In order to verify such phenomena as mentioned above, an experiment was conducted wherein a submarine coaxial cable of about 20 m in length was used in the sea water in the construction shown in FIG. 2. In the experiment, a Senper Max material of 100×60×20 mm is used as a core of an annular closed circuit, the number of windings of the exciting winding $N_1$ is 20 turns, $V_1 = 2.7$ V and $i_1 = 23$ mA. When it is excited with 1 KH$_z$, a current of 29 mA is obtained as the cable signal current $i_2$. In this case, the impedance of the current loop constructed with the cable and the sea water was measured to be 5Ω, and when such values are expressed in the theoretical formula indicated below, $$i_2 = (V_1/N) \cdot (1/R) \tag{1}$$

$i_2 = 27$ mA is obtained to be considerably approximate to the measured value.

Figure 3:
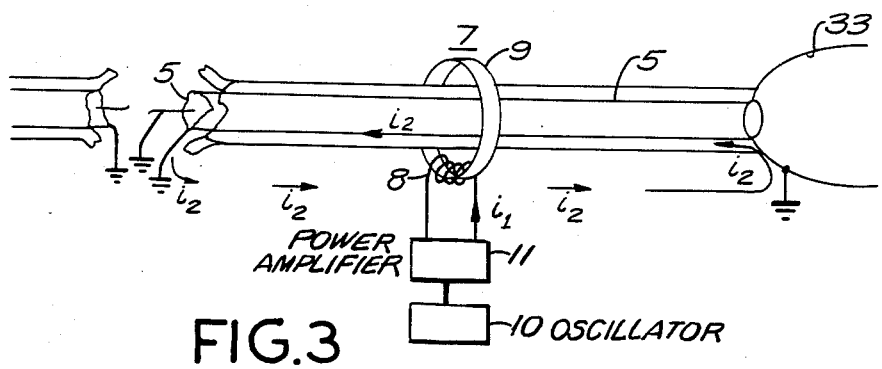
FIG. 3 is an explanatory view of the case wherein the method according to the present invention is applied to a disconnected cable.

FIG. 3 schematically explains that a signal current can be supplied to the cable (according to the method of the present invention) even when the submarine cable has been cut by fishing gear etc. In the figure, since the outer conductor 5 becomes exposed to the sea water at the broken point, the outer conductor 5 comes to have a return circuit comprising the sea water so that the signal current $i_2$ can be passed to the outer conductor 5 by supplying an exciting current $i_1$ to the exciting winding 8.

Figure 4A:
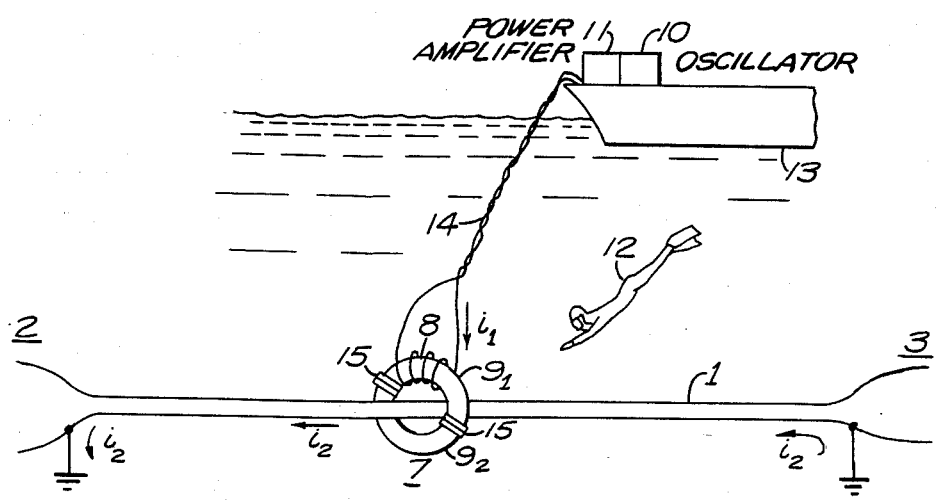
FIGS. 4(a), (b) and (c) show a state wherein a diver is going to couple an annular closed circuit with a cable.

To achieve the purpose of the present invention, said annular closed circuit 7 has to be coupled with a submarine cable 1, but the method varies depending on the conditions of the submarine cable. FIG. 4 indicates a method wherein a diver 12 couples an annular closed circuit 7 with a cable 1 which has been laid out beneath the sea at such a shallow depth that a diver can reach it. FIG. 4(a) shows that after the diver has coupled two magnetic substances separated into two semispherical bodies $9_1$, $9_2$ with the cable 1, an AC signal current $i_1$ is supplied to the exciting winding 8 via a lead line 14 from an oscillator 10 and a power amplifier 11 mounted on the mother ship 13. In the figure the reference numeral 15 denotes a locking device made of a magnetic substance used for securely fixing the two magnetic substances $9_1$, $9_2$ to form an excellent annular closed circuit 7.

Figure 4B:
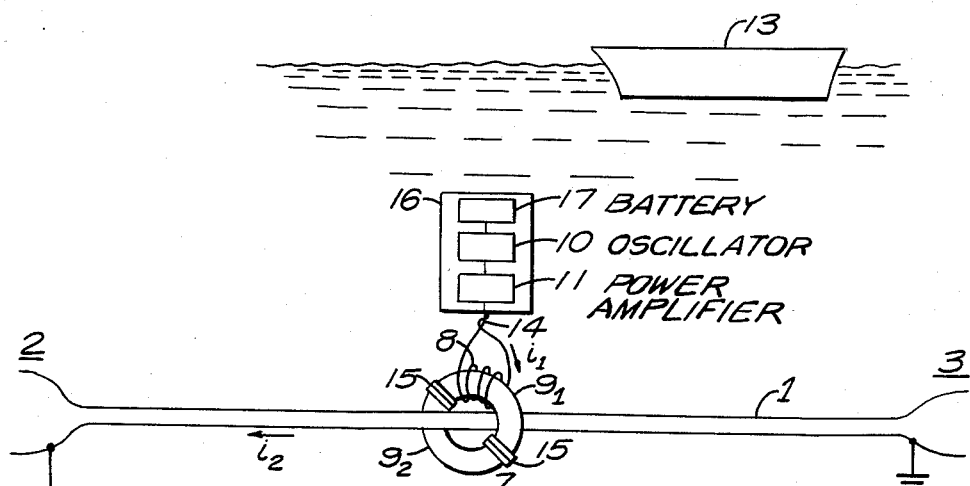
Figure 4C:
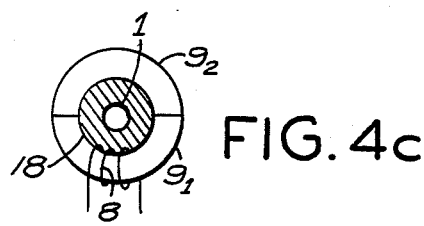

FIG. 4(b) indicates another method wherein the method for coupling the annular closed circuit 7 with the cable 1 is identical to the one shown in FIG. 4(a), but the oscillator 10 and the power amplifier 11 for exciting the exciting winding 8 are housed within a buoyant water-tight housing 16 to be used as an AC signal current supply device (hereinafter referred to as a supply device) and the supply device is positioned close to the annular closed circuit 7. The reference numeral 17 denotes a battery. In this method, in order to prevent the power loss caused by the current $i_4$ as indicated in FIG. 1(c) as the sea water flows through the inner side of the annular closed circuit 7, a diaphragm wall 18 may be provided as shown in FIG. 4(c).

Both in the embodiments shown in FIGS. 4(a) and (b), since an AC signal current $i_2$ passes to the cable under the condition indicated, the position of the cable can be detected by detecting the magnetic field created by the current $i_2$ with a magnetic field detector, so that operational machines etc. may be enabled to perform monitoring or maintenance work. In both cases, when the operation ends, the diver 12 detaches the lock 15 and recovers the magnetic substances $9_1$; $9_2$ aboard the mother ship 13. In the present embodiment, although description was made in respect of a structure where a water-tight housing having a buoyance was used as a guide signal supplying device, the present invention is not to be limited to this embodiment and the system may be of any arbitrary type such as one which directly supplies from the mother ship, or which is incorporated inside a cable coupling device to which reference will be made later.

Figure 5:
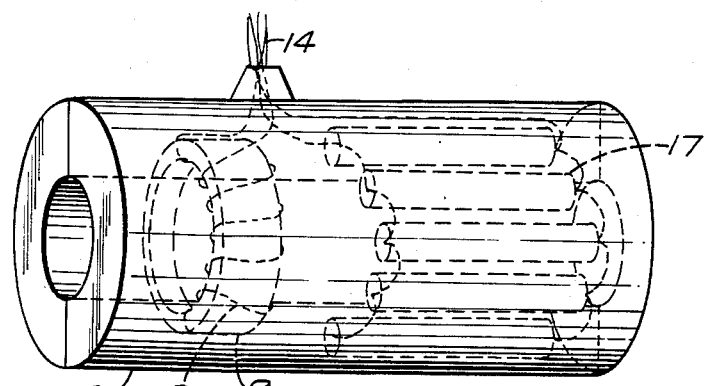
FIG. 5 shows another embodiment of the structure of the cable coupling device.

FIG. 5 shows the structure of another embodiment of the cable coupler wherein an annular closed magnetic circuit type exciter coil 9 wound with an exciter wiring 8 and a battery 17 are sealed inside a non-metallic (i.e. plastic) water-tight housing 16 of the co-axial structure. When the guide signal supplying device as shown in FIG. 4(b) is used, AC signals for excitation are supplied to the exciter coil 9 by the lead cable 14, and AC signal current is passed to the cable coupled to the axial core of the water tight container based on the principle discussed before.

Figure 6A:
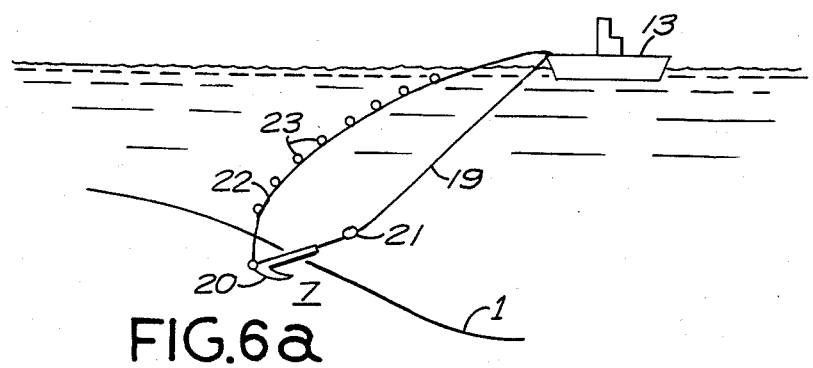
FIGS. 6(a), (b) and (c) are explanatory views to show a method for coupling with, and recovering an annular closed circuit from, a cable which has been laid out on sea beds in water too deep for a diver to reach.

FIGS. 6(a), (b) and (c) explain the method for coupling an annular closed circuit 7 with a cable which has been buried underneath the sea bed in waters of a depth which a diver can not reach and/or detach it from the cable so as not to obstruct operations.

FIG. 6(a) indicates a state wherein an annular closed circuit 7 in a shape like a plough having a cable-grasping function is towed upon the sea bed by a front-tow cable 19 connected to the mother ship 13 and more particularly a state wherein the cable 1 is about to be grasped by the plough 20. The reference numeral 21 denotes a weight which stabilizes the travelling of the annular close circuit 7, 22 a rear-tow cable, and 23 a buoy which gives the rear-tow cable a small degree of buoyancy.

Figure 6B:
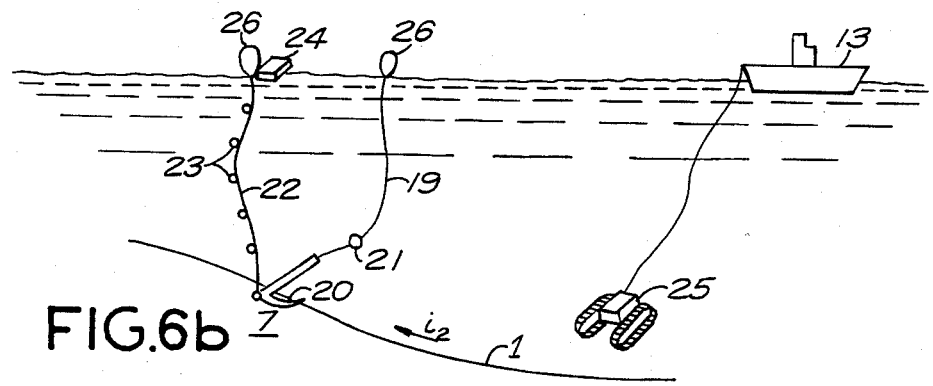

FIG. 6(b) indicates a state wherein after the annular closed circuit 7 has grasped the cable 1, the closed circuit 7 is coupled with the cable, supplying an AC signal current to an exciting winding 8 of the annular closed circuit 7 via the signal lines within the rear-tow cable 22 from the exciting power source 24 comprising an oscillator, a power amplifier, a battery etc. to pass the AC signal current $i_2$ through the cable 1. Since in this method the exciting power source 24 is separated from the mother ship 13, the mother ship 13 can concentrate its efforts on the controlling of the working machines 25. The reference numeral 26 denotes buoys to keep both tow cables 19 and 22 afloat on the water surface.

Figure 6C:
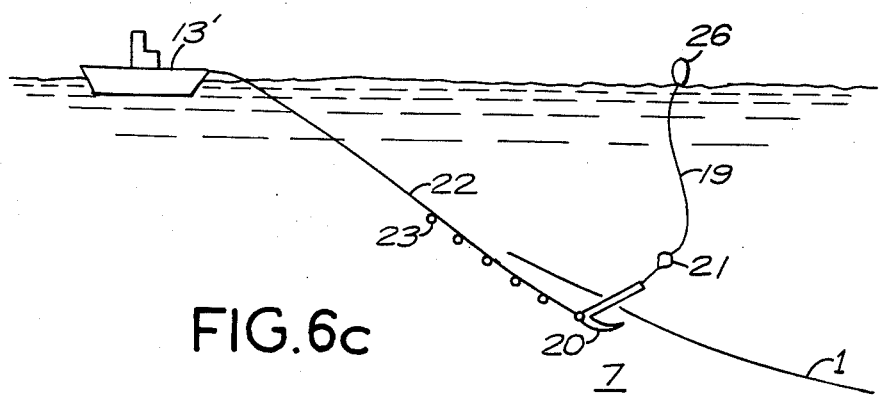

FIG. 6(c) indicates a state wherein the annular closed circuit is being detached from the cable 1 in order to remove it out of the way of the operation or after the operation and is to be recovered by the mother ship 13 or a support ship 13'. The buoy 26 to hold the rear-tow cable 22 and the exciting power source 24 which are used in FIG. 6(b) can be collected to, for instance, a support ship 13' and the annular closed circuit 7 is detached from the cable 1 by pulling the rear-tow cable 22 backward.

Figure 7A:
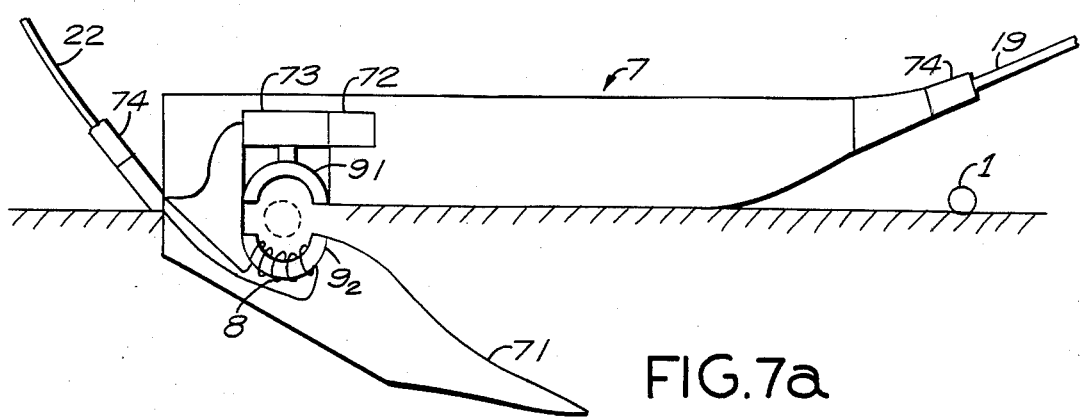
FIGS. 7(a) and (b) are explanatory views showing an embodiment of the annular closed circuit which is equipped to catch cables.

FIGS. 7(a) and (b) show an embodiment of the annular closed circuit 7 having a cable grasping function.

FIG. 7(a) corresponds to the annular closed circuit 7 described in FIG. 6 which is equipped with the function to grasp cables. In the figure, the symbols $9_1$ and $9_2$, denote magnetic substances constructing an annular closed circuit 7 as they are closed and $9_2$ has an exciting winding 8 and is fixed on the base of the plough 71 while $9_1$ is a movable magnetic substance connected to a helicoid straight driving means 73 which is driven by a motor 72. As the cable 1 is grasped by the plough 71 and brought to the position indicated by a dotted line in the figure, the inductance changes on the exciting winding 8. Since the lead line of the exciting winding 8 extends through the rear tow cable to a bus bar, the changes in the inductance can be immediately detected from aboard the mother ship so as to know that the cable 1 has come into the magnetic substances $9_1$, $9_2$. Then, the motor 72 is directed from the mother ship to start lowering the movable magnetic substance $9_1$ so as to bring it into contact with $9_2$, completing an annular closed circuit 7. Load cells 74 are inserted between the annular closed circuit 7 and the front and rear tow cables 19, 22 to measure towing tensile strength; therefore, whether the cable 1 has come to settle in a predetermined position or not can be detected by measuring the output from the load cell 74, too. The annular closed circuit 7 can be detached from the cable 1 simply by following the above procedure in the reversed order and more particularly, by moving the helicoid straight driving means 73 to move the movable magnetic substance $9_1$ upward and then by pulling the annular closed circuit 7 rearward with the rear-tow cable 22.

Figure 7B:
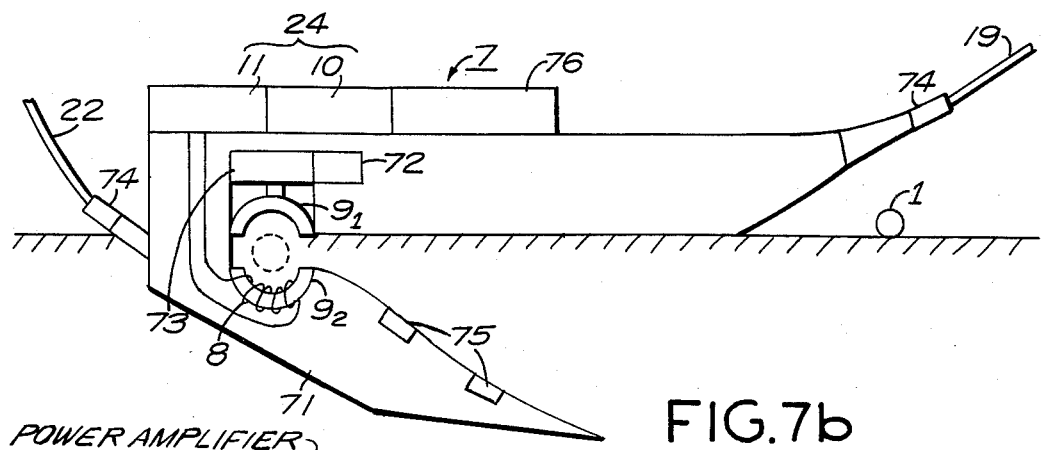

FIG. 7(b) shows a still other embodiment of the annular closed circuit 7 equipped with the function to catch cables. In the embodiment, the annular closed circuit 7 is adapted to include a power supply means for the exciting power source 24 comprising an oscillator 10, a power amplifier 11 etc. It further is adapted to have a cable sensor 75 such as, for instance, a metal detector, which is embedded in the plough 71 in order to detect whether the cable 1 has been grasped by the plough 71 or not with a higher accuracy. The reference numeral 76 denotes an electronic circuit of the cable sensor of a metal detector type 75 wherein a detection signal obtained by the circuit 76 is transmitted to the mother ship via the rear-tow cable 22. The annular closed circuit 7 shown in FIG. 7 is applicable to the cable laid out upon sea beds or to the cable buried therein.

Figure 8A:
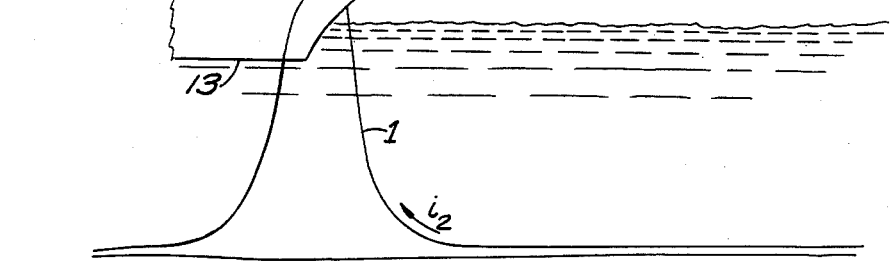
FIGS. 8(a) and (b) show a method for coupling an annular closed circuit with a cable which has been lifted aboard the mother ship.
Figure 8B:
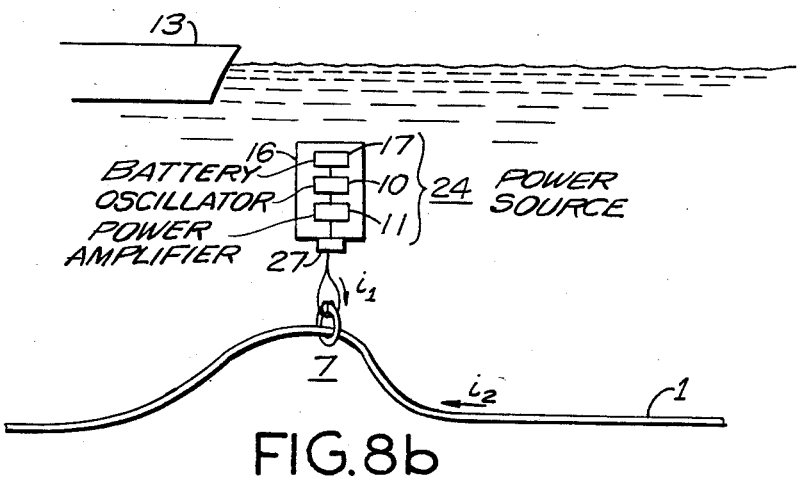

FIGS. 8(a) and (b) indicates a method for coupling an annular closed circuit 7 with a cable 1 aboard the mother ship 13 when the cable 1 is lifted aboard the ship to repair disconnected portions. FIG. 8(a) shows a state in which the cable 1 held by the mother ship 13 has been coupled with the annular closed circuit 7 and is supplied with the current from the oscillator 10 and the power amplifier 11 so as to pass an AC signal current $i_2$ to the cable 1. FIG. 8(b) depicts a situation wherein the annular closed circuit 7 which has been coupled with the cable 1 on the mother ship 13 as shown in FIG. 8(a) is thrown into the water together with the exciting power source 24 comprising the oscillator 10, the power amplifier 11, the battery 17 etc. The reference numeral 16 denotes a water-tight housing and a means to detach the annular closed circuit 7 from the water-tight housing 16 containing the exciting power source 24 by instructions sent via ultrasonic signal after the cable has been connected to the machine so that the housing would not be in the way during a protection operation such as burying the cable.

The method for coupling an annular closed circuit 7 with the cable 1 aboard the mother ship 13 is extremely effective for the cable installation construction work for the cable system. In this method the cable 1 is thrown into the water from the mother ship 13 consecutively. Since an unburied portion of the cable is always kept aboard the mother ship, the coupling of the cable with the annular closed circuit 7 is readily conducted to supply a signal current to the cable 1. A monitor device for the construction can be made to travel along the cable simply by detecting an AC magnetic field generated by the signal current.

Figure 9A:
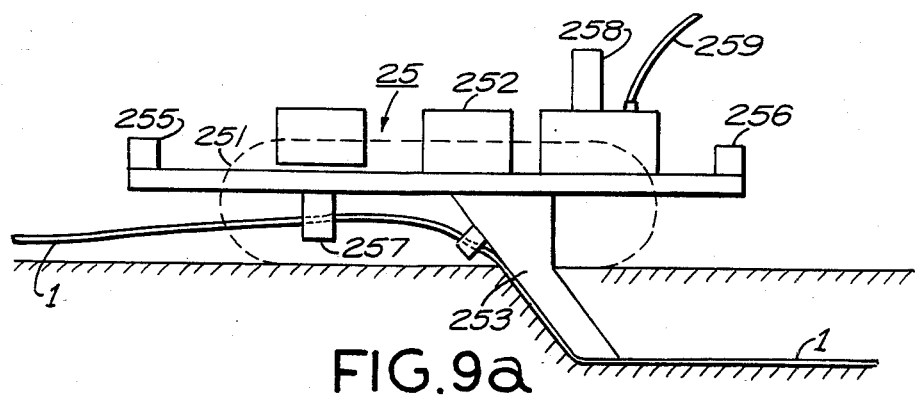
FIGS. 9(a) and (b) show one embodiment of the burying device used in the present invention.

FIGS. 9(a) and (b) show one example of a structure for the burying device. The burying device 25 has a travelling crawler 251 driven by the power supplied from the mother ship via the power line inside the control cable 259, and supplies the jet water to the injection nozzle 254 inside the injection excavation mechanism 253 by using a water bed excavation means disposed on the burying device 25, for instance, an injection pump 252, thereby removing the earth around the cable and burying the cable. The burying device 25 is further provided with magnetic sensor systems 255, 256, and is so made that it can detect the magnetic field generated by the current $i_0$ which is given by the formula (1) and passes through the cable[1]. Supposing that the current $i_0$ passes to the cable, the intensity of the magnetic field ($H_0$) located at a point L (m) away from the cable becomes approximately $$H_0 \text{ (gamma)} = 200 i_0/L \qquad (2)$$

Thus, by guiding the burying device 25 toward the direction where the detected magnetic field magnifies, it is possible to easily bring the burying device 25 closer to the cable 1 which is to be buried.

Figure 10:
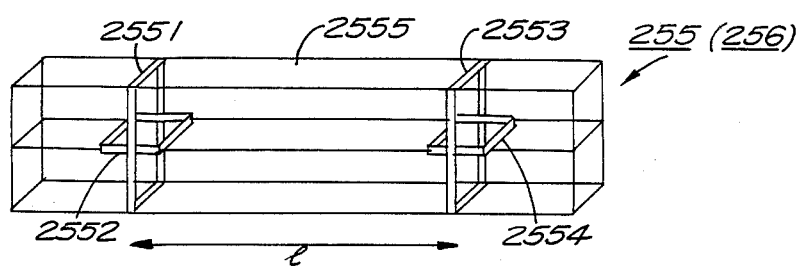
FIG. 10 is an explanatory diagram for a magnetic sensor system.
Figure 11:
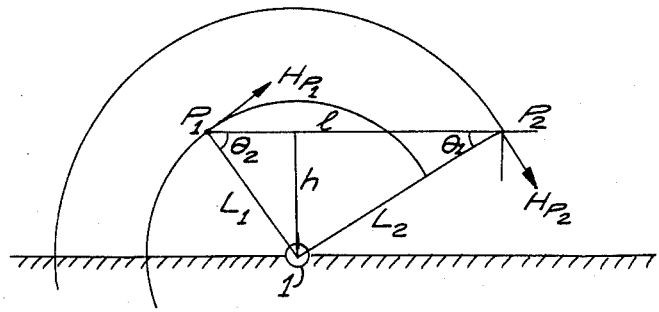
FIG. 11 is an explanatory diagram for showing the maximum sensitivity detection directionality of the magnetic sensor system.

Reference is made to FIG. 10 in order to explain the structure of the magnetic sensor systems 255, 256. The sensors comprise coils 2551, 2552 and coils 2553, 2554 respectively positioned perpendicular to each other, the two sets of coils being placed inside the water tight housing 2555 with an interval of l therebetween, and each of the coils has its maximum sensitivity in the axial direction of the coil. In other words, the coils 2551 and 2553 have the maximum sensitivity detection directivity in the horizontal direction, and the coils 2552 and 2554 in the vertical direction. As shown in FIG. 11, supposing that the coils 2551, 2552 and the coils 2553 and 2554 are at the positions $P_1$ and $P_2$, and the cable 1 is positioned at a point lower by h from the plane of $P_1$–$P_2$, then there accrue magnetic fields having the directions $H_{P1}$ and $H_{P2}$ at points $P_1$, $P_2$ by the current $i_0$ passing inside the cable from the direction of the right face of the paper toward the back thereof as shown in FIG. 11. When the distances between the cable 1 and the points $P_1$, $P_2$ where the coils are positoned are set respectively as $L_1$, $L_2$, then the magnetic fields $H_{P1}$, and $H_{P2}$, in the vertical direction of the magnetic fields $H_{P1}$, $H_{P2}$ at the points $P_1$, $P_2$ where the coils are positioned are sought by the following formulae.

$$H_{P1}' = H_{P1} \cos \theta_2 = (200 i_0/L_1) \cos \theta_2$$

$$H_{P2}' = H_{P2} \cos \theta_1 = (200 i_0/L_2) \cos \theta_1 \qquad (3)$$

Where the cable 1 is over the center line of the line between the points $P_1$ and $P_2$, the above formula (3) obtains $L_1 = L_2$, $\theta_1 = \theta_2$, and $H_{P1}'$ and $H_{P2}'$ become magnetic fields which are equal to each other in size, but reverse in symbols.

From the above, it becomes apparent that the burying device 25 is guided to a point right above the submarine cable 1 which is to be buried by moving the travelling crawler 251 of the burying device 25 in such a way that the components in the vertical directions to be detected respectively by the magnetic sensor systems 255, 256 (FIG. 9) have the construction shown in FIG. 10 would become the same size but of the opposite symbols after the burying device 25 approaches the submarine cable 1.

On the other hand, the tracking signal supplying device 257 of a cable guide system shown in FIGS. 9(a) and (b) catches the cable 1 with an arm comprising a portion of the supplying device 257 after the burying device reaches a position immediately above the cable 1, and then inserts an annular type closed magnetic circuit exciter coil having the exciter wiring of the identical structure as shown in FIG. 5 over the cable thus caught. The exciter coil is provided integrally with said cable catching arm on the supplying device 257, and becomes separated into two when being inserted over the cable, and closed thereafter to become integral with the cable 1 and form a closed magnetic circuit. After being inserted over the cable 1, the exciter coil is used to supply AC signals to the submarine cable 1 for guiding the burying device, while the guide signal supplying device of FIG. 4, which had initially been attached to the cable 1 at the portion denoted 16 of the water tight container shown in FIG. 4, is cut off upon receipt of instruction signals from an ultrasonic oscillator 258 provided in the burying device 25 by the receiver inside the cutting device since the supplying device gets in the way of the burying operation.

Figure 9B:
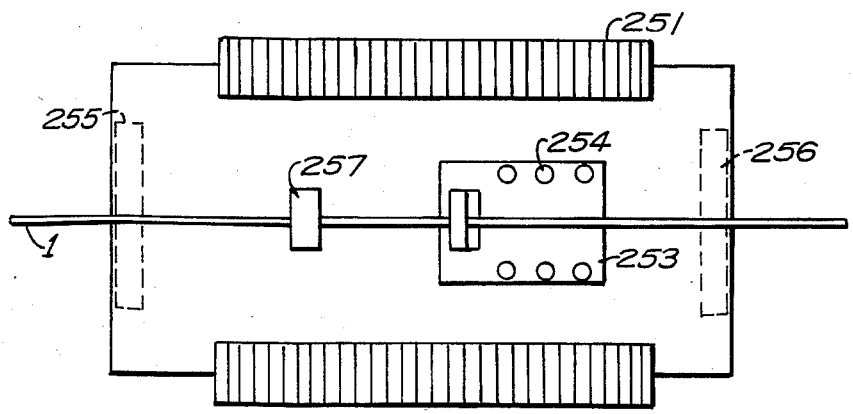

The tracking signal supplying device 257 of a cable guide type shown in FIGS. 9(a) and (b) catches the cable 1 by its arm which forms a part thereof after the burying device 25 moves immediately above the cable 1, and inserts the annular closed magnetic type exciter coil having an exciter wiring of the identical construction as shown in FIG. 5 over the cable 1 thus caught. The exciter coil is provided on the supplying device 257 integrally with said arm, and becomes separated when being inserted, and then integrated into one after insertion over the cable 1, thereby forming a closed magnetic circuit. The exciter coil is used to supply AC signals for guiding the burying device 25 to the cable to be buried 2 after the coil is inserted over the cable 1. The guide signal supplying device of FIG. 4, which had been attached initially to the cable 1, at the portion 16 of the water tight container is cut off upon receipt of instruction signals from an ultrasonic oscillator 258 provided on the burying device 25 by the receiver inside the cutting device since the supplying device gets in the way of the burying operation. In the present embodiment, explanation was given in respect of the system where an exciter coil of an annular closed magnetic circuit with an arm for catching the cable being integrally built is used to guide the burying device 25 along the cable 1 after engaging the burying device 25 with the cable 1. The present invention is not to be limited to this embodiment alone, and it may utilize the cable coupling device (of FIG. 5) which had been used to bring the burying device 25 closer to the cable 1 prior to their engagement. In this case, a catching means for the cable coupling device may be provided integrally with the cable catching means provided on the supplying device 257. The magnetic sensor system 256 shown in FIG. 9 is used along with the magnetic sensor system 255 for detecting the positions of the burying device 25 and the cable 1. It is also used to detect the depth of the buried cable 1. The distance h between the cable 1 and the sensor plane (the plane connecting $P_1$ and $P_2$) when the cable 1 and the sensors (at positions $P_1$, $P_2$) are in the relative positions as shown in FIG. 11 may be sought by the formula $$h = \frac{\tan \theta_1 \cdot \tan \theta_2}{\tan \theta_1 + \tan \theta_2} l \quad (4)$$

wherein $\tan \theta_1$ and $\tan \theta_2$ are given by the ratio of the detection outputs of the coils 2551 to 2554 of the sensors, viz.

$$\tan \theta_1 = \frac{Va' \text{ (detection output of coil } a\text{)}}{Vb' \text{ (detection output of coil } b'\text{)}}$$

$$\tan \theta_2 = \frac{Va \text{ (detection output of coil } a\text{)}}{Vb \text{ (dection output of coil } b\text{)}}$$

As has been discussed in detail referring to the embodiment disclosed in the drawings, it is possible to supply the signals from an arbitrary portion of the submarine cable for guiding the burying device according to the present invention. Thus, the burying device can approach the cable accurately while detecting the guide signals, and after having approached the cable, the burying device itself supplies the signals for guiding the burying device along the cable, while detecting the guide signal by the magnetic field detecting device provided thereon for accurate travelling of the device along the cable. Accordingly, the present invention offers a technology for performing a speedier and securer burying operation for a submarine cable and has a technology of high inventiveness.

We claim:

1. A method of detecting the position of a length of submarine cable buried beneath a sea bed, said cable being of the type having repeater casings connected to the cable to form a closed circuit, comprising: catching the cable with a first semi-annular magnetic body being towed along the sea bed and having an exciting winding, moving a second semi-annular magnetic body into engagement with said first magnetic body to form an annular magnetic body around said cable, supplying an AC signal current to said exciting winding to thereby induce an AC signal current in said cable by electromagnetic induction, and detecting an AC signal magnetic field generated by said AC signal current with a magnetic field detector.

* * * * *